Oct. 21, 1969  A. H. MORGAN  3,473,304
VEGETABLE AND FRUIT HARVESTER
Filed Oct. 3, 1967  2 Sheets-Sheet 1

INVENTOR
ARTHUR H. MORGAN
BY Cameron, Kerkam & Sutton
ATTORNEYS

Oct. 21, 1969   A. H. MORGAN   3,473,304
VEGETABLE AND FRUIT HARVESTER
Filed Oct. 3, 1967   2 Sheets-Sheet 2

INVENTOR
ARTHUR H. MORGAN

BY
Cameron, Kerkam & Sutton
ATTORNEYS

United States Patent Office 3,473,304
Patented Oct. 21, 1969

3,473,304
VEGETABLE AND FRUIT HARVESTER
Arthur H. Morgan, Knoxville, Tenn., assignor to University of Tennessee Research Corporation, Knoxville, Tenn., a corporation of Tennessee
Filed Oct. 3, 1967, Ser. No. 672,512
Int. Cl. A01d 45/00; A01g 19/00
U.S. Cl. 56—19                          12 Claims

ABSTRACT OF THE DISCLOSURE

This vegetable and fruit harvester comprises an open, cylindrical housing provided with wheels at its forward and rear extremities, within which is rotatably mounted an open helix, driven from a motor on the housing and within which is also rotatably mounted a counter-rotating helical brush means within the lower, forward end of the helix, the lateral, forward extremity of the housing being slotted to receive the plants to be harvested. The counter action of the helix and brush grips the plants as they slide within the slot, and pulls them downwardly, stripping the pods, vegetables or fruit from the plants, as the machine is moved forwardly down a row thereof.

BACKGROUND OF THE INVENTION

This invention relates to mechanical harvesters for vegetables and fruits of the type produced on low growing or lying plants, which are either manually or mechanically propelled down a row of the plants to strip the produce therefrom.

In the past, various solutions to the harvesting problem have been developed some of which employ somewhat analogous rotating helical means combined with ancillary cutters or strippers for receiving and binding the plants and removing the produce therefrom. Most of the prior art devices are designed specifically for one type of plant and are thus specialized for utilization on this type of plant alone.

Many of these early harvesters proved to be unsatisfactory, due to incomplete harvesting of the crop, damage thereto and complexity of operation.

In the past, it was usual to pick beans, peas, lima beans, tomatoes, and other delicate vine-type crops by hand, to completely harvest the corp and to prevent damage to the produce. Obviously, this hand method of harvesting required many hands, a great deal of time, and an unlimited amount of comparatively cheap labor. Today, due to labor shortage and high wages, such harvesting is becoming less and less practical, necessitating the use of mechanical harvesting means analogous to that of the present invention, for efficient and inxpensive harvesting of such crops.

A number of somewhat analogous harvesters are disclosed in the prior patented art.

Typical of these patents are Hibbs et al., No. 684,934; Grether, No. 2,641,888; Horst, No. 2,645,893, and Martin, No. 3,119,221.

Of these patents, Martin is pertinent as it shows a rotating helix and a conveyor associated therewith for removing the crop from the machine. It also shows an associated counter bar, but does not show a cylindrical, slotted housing in which the helix rotates.

Horst, No. 2,645,893 shows a rotating helix and brushes, which, however, operate on a different principle from the subject invention.

Another patent of interest is No. 769,744, which shows a somewhat analogous structure but includes two rotating helixes pulling corn into a slot and rollers wherein the ears are removed therefrom and whence they are deposited on a conveyor for removal from the machine.

While certain of these prior art patents suggest certain aspects of the present invention, none of them suggest the subject novel combination and none of them disclose an apparatus which operates with the ease and efficiency of the present invention. The crux of the present invention is the interaction between the open-ended helix, the counter-rotating brush and the aligned slot, the interaction between which provide the "gripping" or pulling effect to pull and bind the plants therebetween and to strip the pods or the produce therefrom. This action is further enhanced by the operation of the forward guide means and the peripheral slot leading into the helix in the housing which properly directs the plants within the helix and brush structure.

SUMMARY OF THE INVENTION

To summarize the invention briefly, it broadly comprises an open-ended, cylindrical housing which is slotted rearwardly at its lower, forward extremity and is provided with wheels at its forward and rear extremities for ready mobility over the ground. Rotatably mounted within the cylindrical housing and extending forwardly therefrom is a helix of slightly smaller diameter than the housing, provided with drive means mounted upon the housing for rotating the helix in a clockwise direction.

Rotatably mounted within the housing and lying within, the lower, forward portion thereof, is a helical brush whose axis is parallel to the axis of the helix and which is driven in a counter direction to the helix, from the same source of power.

Handle means are provided at the rear extremity of the housing to push and direct the apparatus down a row of plants, or, if desired, the housing may be self-propelled.

Provided at the lower, forward extremity of the housing is a rearwardly extending slot which acts to guide plants into the grip of the rotating helix and brush.

Suitable conveying means are provided beneath the lower, rear extremity of the housing for conveying harvested produce therefrom.

It is therefore a primary object of this invention to evolve a harvesting machine which will efficiently harvest the produce from low-lying plants, such as beans, peas, and so forth.

It is a further object of this invention to evolve such a machine which operates on various types of plants and which may be readily modified to harvest tuberous vegetables such as potatoes, turnips and other subterranean vegetables.

It is another object of this invention to evolve such a machine in which all moving parts are powered from the same power source.

Other and further objects of this invention will become apparent as this specification proceeds.

BRIEF DESCRIPTION OF THE DRAWINGS

Referring to the drawings.

DESCRIPTION OF THE PREFERRED EMBODIMENT

Figure 1:
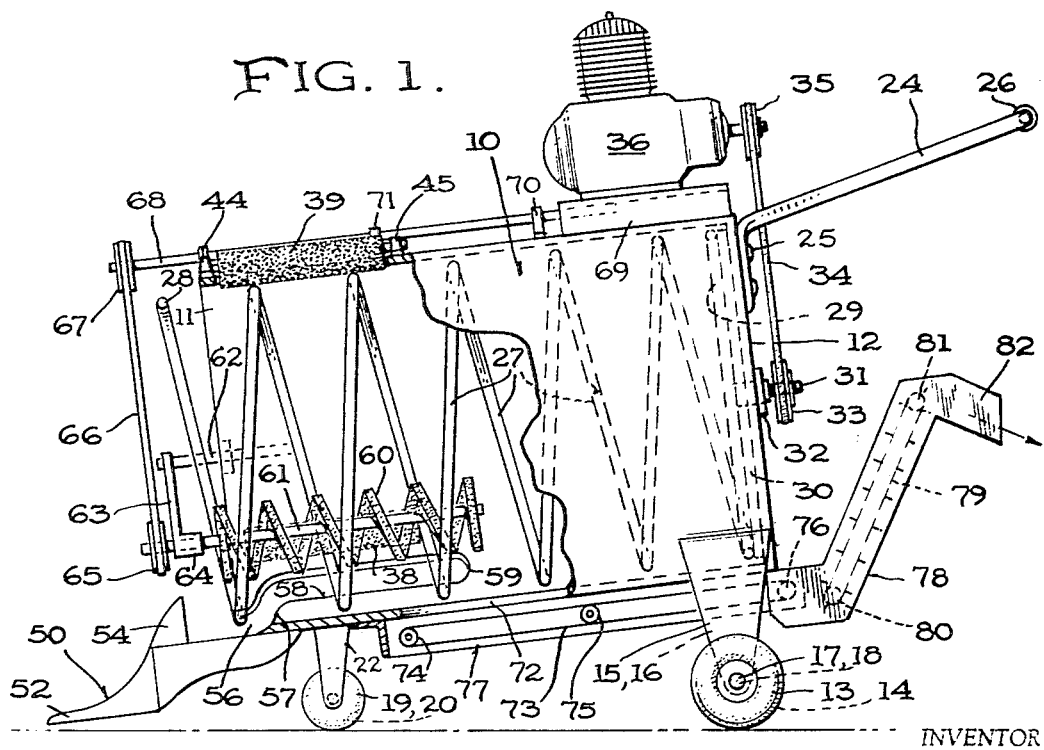
FIG. 1 is a side elevation, partially broken away and in phantom, of the subject machine in operating position, showing the relative positions of the helix and the counter-rotating brush, and the forward guide means and slot in the housing.
Figure 4:
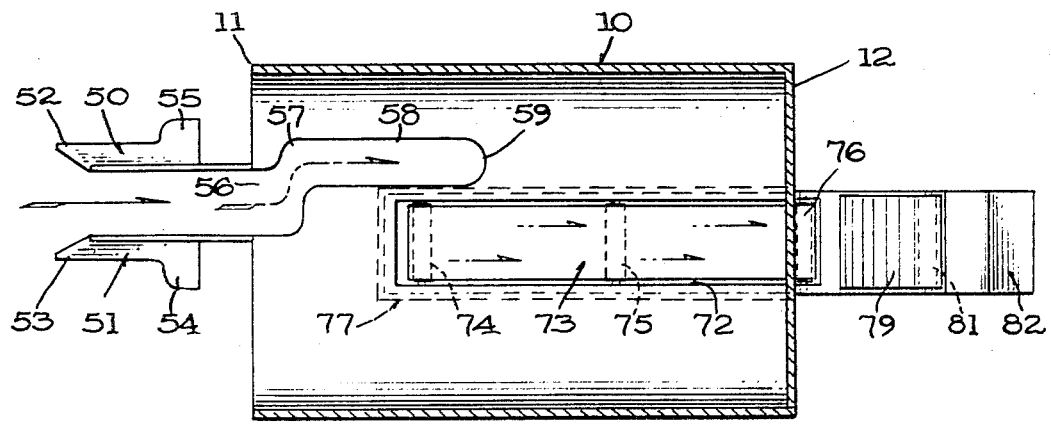
FIG. 4 is a fragmentary, horizontal sectional view of the lower portion of the housing of the machine, showing the plant guides and slot in the forward extremity thereof and the conveyor means beneath the rear extremity of the housing for conveying the produce rearwardly out of the housing.
Figure 5:
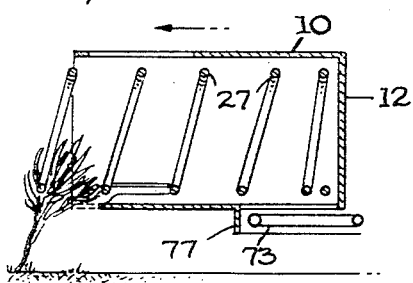
FIG. 5 is a schematic, vertical sectional view of the machine entering a row of plants.

In the drawings, in which like numerals designate like elements throughout, FIG. 1 is a side elevation, partially broken away and in phantom, of a preferred embodiment of the subject harvesting machine. The housing 10 which forms the casing for the machine is preferably formed of light gauge steel and is, as shown, cylindrical in shape, open at its forward extremity 11 and closed at its rear extremity 12. When the machine is being used as comparatively low lying plants, such as green beans, lima beans, peas or analogous crops, the casing 10 is preferably mounted in a horizontal position approximately four inches above the ground and in this embodiment the casing may be three feet in length and of an inside diameter of about 20 inches. Obviously, where the machine is being used on taller plants, such as tomatoes and other higher growing crops the elevation of the casing 10 and its dimensions may be approximately increased.

Casing 10 is preferably movably supported with respect to the ground on a pair of rear wheels 13 and 14 which are appropriately supported beneath the rear extremity of the machine on brackets 15 and 16. Brackets 15 and 16 are preferably on the order of 4" in height and wheels 13 and 14 are freely, rotatably mounted at their outer, lower extremities on axles 17 and 18.

At its forward, open extremity 11 casing 10 is preferably supported on wheels 19 and 20 rotatably mounted at the lower extremities of forward wheel brackets 21 and 22. Wheels 19 and 20 are preferably aligned in the same vertical plane, respectively as rear wheels 13 and 14 whereby the machine may be readily moved over the ground by the operator. If desired, a single, swivel-mounted wheel may be substituted for paired wheels 19 and 20, beneath the forward, center extremity of casing 10.

At is upper rear extremity, casing 10 is preferably provided with handle means 24, affixed to the upper portion of rear wall 12 by appropriate bolts or rivets 25 and extending upwardly therefrom for ready grasping of the handle 26 by the operator of the machine.

Rotatably mounted within casing 10 is a convolute steel helix 27 of slightly smaller diameter than casing 10. The lead or spacing between the coils of the helix 27 depends upon the size of the crop being harvested, but normally for crops such as green beans, the spacing between the coils should be 3–4 inches. Where the inner diameter of the casing 10 is 20 inches, the diameter of the helix 27 will be approximately 19 inches.

As shown, helix 27 preferably comprises some seven turns, the forward of which 28 is an open or "hook" extremity, for a purpose hereinafter more fully to be discussed.

At its base or inner extremity, helix 27 is preferably welded at its terminal coil 29, which is preferably rebent, to the peripheral surface of circular base plate 30.

As shown, base plate 30 of helix 27 preferably bears closely and rotatably against the inner surface of base well 12 of casing 10 and is rotatably mounted centrally thereof by means of a stub axle 31 and bearing 32 affixed to the bored, center surface of rear wall 12 of casing 10. Axle 31 of base plate 30 is preferably extended outwardly through bored bearing 32 and is provided with a pulley 33 at its outer extremity, which is peripherally grooved to receive endless belt 34 from pulley 35 of a small gasoline engine 36 which is, as shown, appropriately mounted on the upper, rear surface of casing 10 to provide rotative power to the helix 27, as will hereinafter be more fully discussed.

It will be noted that the outer extremity or "hook" 28 of helix 27 extends outwardly an appreciable distance, i.e., 1–2", beyond the outer, open extremity 11 of casing 10, whereby when rotation is imparted to helix 27 from motor 36 through belt 34 the hook extremity 28 of helix 27 will rotate in a clockwise direction and will act to pick up and entrap low lying plants as it completes its downward travel, as will be further discussed.

Figure 3:
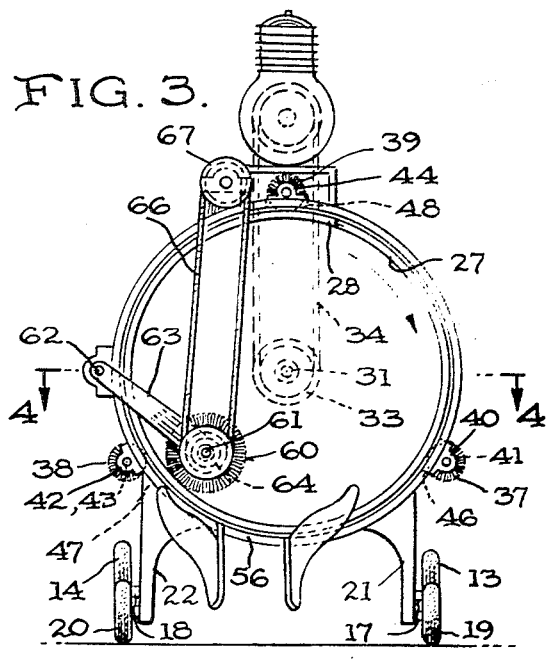
FIG. 3 is a front elevation of the machine, partially in phantom.
Figure 6:
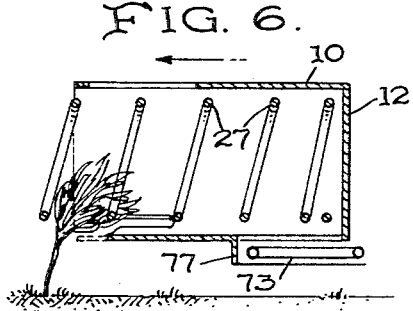
FIG. 6 is a similar schematic, vertical sectional view of the machine with the helix engaging the first plant of a row.
Figure 7:
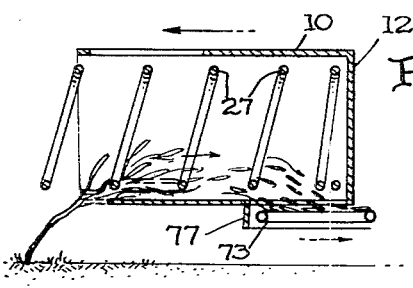
FIG. 7 is a similar schematic view showing the harvesting operation on the plant, with the produce being deposited on the conveyor at the rear, lower extremity of the housing.

At its forward extremity, helix 27 is preferably supported rotatably within the open extremity 11 of casing 10 by means of three peripheral roller members 37, 38 and 39, which are preferably rotatably mounted, respectively, in appropriate bearings 40–41, 42–43 and 44–45, which are positioned, respectively, adjacent the forward and rear extremities of longitudinal slots 46, 47 and 48, preferably arranged, as shown in FIG. 3, in the opposite lower lateral surfaces of casing 10 and its upper forward surface, whereby rollers 37, 38 and 39 will bear against the outer surfaces of the two forward coils of helix 27 to maintain it in proper alignment coaxially within casing 10.

As shown, rollers 37, 38 and 39 are preferably on the order of one-third of the length of helix 27 and are supported respectively in their respective bearings on integral axles for free rotation in their respective slots in casing 10 and for free bearing engagement against the outer surfaces of the forward coils of helix 27.

It will thus be seen that, when rotation is imparted to helix 27 from motor 36, through belt 34 and pulley 33, the forward or outer extremity of helix 27 will be rotatably maintained in proper axial alignment with the axis of casing 10 by freely rotatable rollers 37, 38 and 39 extending, as aforesaid, through appropriate longitudinal openings disposed in the forward surface of casing 10 to allow passage of the rollers therethrough for free bearing engagement with the outer surfaces of the forward coils of helix 27.

Figure 2:
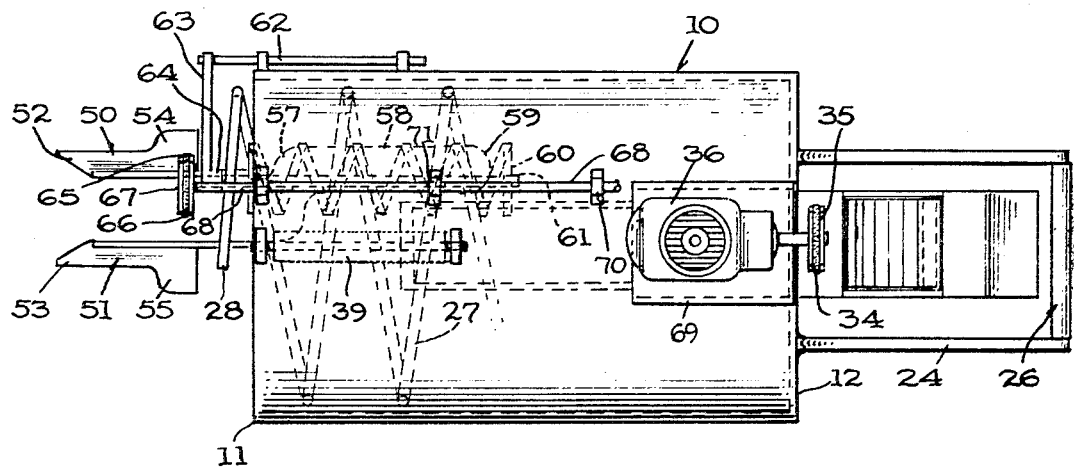
FIG. 2 is a top elevation, partially in phantom, of the machine shown in FIG. 1.

Plant guide members 50 and 51 are shown, affixed as by welding at their inner extremities to the lower, forward surface of casing 10 to one side of its center line, as shown in FIGS. 2 and 3. As shown, guide bars 50 and 51 preferably are parallel and are provided with extended toe members 52 and 53 and upwardly extended flanges 54 and 55, respectively, which act to gather in and confine plant stems, foliage and crops in a restricted condition as they pass into casing 10 and helix 27, as will hereinafter be more fully discussed. Aligned centrally with the space between guide bars 50 and 51 is a slot 56 cut into the lower, lateral surface of casing 10, which, as shown, is rectangularly extended at 57 and then rearwardly extended at 58, the terminal extremity 59 thereof, extending rearwardly in casing 10 to a point approximately one-half of the length of casing 10, or to approximately the median point of helix 27.

The purpose of slot 56 will be more fully discussed later in this specification.

Disposed within the lower periphery of helix 27 and rotatably mounted therewithin is a helical brush member 60, preferably consisting of six turns disposed oppositely to the turns of helix 27 and mounted upon a longitudinal shaft or axle 61 within the lower turns of helix 27 by means of a rectangular bracket 62–63 affixed laterally of and extending forwardly of casing 10. At its lower extremity, rectangular bracket 63 is provided with a rectangularly disposed, cylindrical bearing 64 in which shaft 61 of brush 60 is rotatably mounted for rotation of brush 60 within the lower coils of helix 27.

Brush 60 is preferably of a diameter of about one-fourth the diameter of the coils of helix 27, or about 5".

At its outer extremity, shaft 61 of brush 60 is provided with a pulley 65, receiving an endless belt 66 from drive pulley 67 of rotatable drive shaft 68 extending forwardly from gear box 69 beneath motor 36. As shown, drive shaft 68 is rotatably supported on the upper surface of casing 10 by means of appropriate bearings 70 and 71 mounted thereon.

Helix 27 is preferably rotated in a clockwise direction at a relatively low speed by means of belt 34 from pulley 35 of motor 36. Brush 60 is preferably rotated at a higher rate of speed and in a counterclockwise direction by belt 66 from drive pulley 67 of shaft 68, also driven by motor 36, as will hereinafter be further discussed.

At its lower, rear surface, casing 10 is preferably provided with a longitudinal opening 72, beneath which is movably mounted an endless belt means 73 supported therebeneath on rollers 74, 75 and 76. The belt and roller system preferably is enclosed within a suitable rectangular housing 77 affixed beneath opening 72 on the undersurface of casing 10, as shown. Terminal roller 76 of belt 73 is preferably driven by a belt system (not shown) from motor 36. Opening 72 and endless belt 73 are provided to remove the produce from the plants from the rear extremity of casing 10, as will be further discussed.

Extending rearwardly and upwardly from the rear extremity of belt housing 77 is a housing 78 within which is mounted a slatted elevator belt 79 passing over rollers 80 and 81, which may be driven by an auxiliary belt from roller 76 to roller 80, not shown, to deliver the produce from endless belt 73 upwardly and outwardly through discharge chute 82 at the upper, rear extremity of housing 78.

Helix 27 is preferably rotated in a clockwise direction at a comparatively slow rate of speed, i.e., from 20–30 r.p.m., so that as the plants are engaged between guide bars 50 and 51, as the machine is moved forwardly down a row of plants, the hook extremity 28 of helix 27 will engage the plants as they enter slot 56 in casing 10 and will compress them between its inner coils and the brushes of counter-rotating brush 60 to compress and hold the plants therebetween and pull them down in slot 58 to progressively remove all produce therefrom.

As aforesaid, brush 60 rotates at two or three times the speed of helix 27 in an opposite direction, i.e., counter-clockwise, and thus a considerable compressive or confining action on the plants is obtained due to the interaction of helix 27, slot 56–58 and counter-rotating brush 60.

The action is such that, after produce has been stripped from the plants by the aforesaid interaction of the helix, the slot and the brush, the remnants of the plants will pull out of the terminal extremity 59 of slot 58 and will return to substantially normal position in the ground, with their bean or other crop fully removed.

In operation, with motor 36 started and helix 27 and brush 60 rotating counter to each other, the machine is then aligned by the operator by means of handle 24–26 with a row of the crop, the first plant lying between the guide bars 50 and 51 and the machine is then moved forwardly on its wheels down the row of plants, each plant successively being picked up by helix 27, pulled into slot 56–58 and being compressed between the turns of brush 60 and the outer turns of helix 27 whereby at the extremity of slot 58 all produce will have been pulled off the plants by the aforesaid interaction of helix 27, slot 58 and counter-rotating brush 60 which progressively bend the plants therebetween, compress plants and produce and strip the beans or the produce therefrom, which then drops through opening 72 onto belt 73, which moves in a clockwise direction for removal of the produce from the machine to slatted conveyor 79 and exit duct 82.

The size and dimensions of the machine, including the casing, helix, slot and brush may be widely varied, depending upon the particular crop being harvested. Where the crop is small, such as green beans, lima beans, okra, or other small, low growing crops, the dimensions recited herein are appropriate. Where the plants and crop are larger, such as tomatoes or other sizable produce, the dimensions of the machine may be appropriately increased to accommodate the machine to the larger produce.

The machine may be supported on two wheels and a single swivelly mounted forward wheel, if desired, and further, it may be downwardly inclined by some 7° at its forward extremity, as shown in FIG. 1, to position the toes 52 and 53 of the guide bars 50 and 51 close to the surface of the ground, more readily to pass about the individual plants in a row and to guide them into the helix and slot of the machine.

The machine is preferably pushed or driven down a row of plants at a comparatively slow rate of speed and this speed of movement of the machine should be regulated according to the spacing of the plants, i.e., the closer the plants the slower the speed.

The harvesting machine herein shown and described harvests most crops, i.e., beans, peas, lima beans, okra, tomatoes, and analogous crops efficiently and completely, without damage to the produce and with little damage to the plants.

This specification is by way of illustration of one preferred embodiment of this invention.

Throughout equivalents may be substituted for all elements of the combination without departing from the spirit of the invention.

I claim:

1. In a harvesting machine, a cylindrical longitudinally extending housing open at its forward extremity and provided with a laterally disposed slot extending rearwardly in the cylindrical wall of the housing, wheels affixed beneath said housing providing mobility therefor, a helix rotatably mounted within said housing coaxial therewith, drive means on said housing rotating said helix, brush means rotatably mounted within the lower, forward extremity of said housing within the forward portion of said helix aligned closely therewithin and aligned with said slot, drive means for said brush rotating it counter to said helix, conveyor means mounted at the lower, rear extremity of said housing to remove produce therefrom whereby when said machine is moved down a plant row the produce thereof will be removed by the interaction of said counter-rotating helix and brush and said slot.

2. A machine in accordance with claim 1 in which said brush is approximately one-fourth of the diameter of said helix.

3. A machine in accordance with claim 1 in which said helix is rotated at slow speed and said brush is rotated more rapidly.

4. A machine in accordance with claim 1 in which said brush is approximately one-half the length of said helix.

5. A machine in accordance with claim 1 in which said brush extends rearwardly within said helix to a point adjacent the rear extremity of said slot.

6. A machine in accordance with claim 1 in which said drive means includes a motor mounted on the upper surface of said housing driving a pulley and belt system for each of said helix and brush whereby they are counter-rotated.

7. A machine in accordance with claim 1 in which guidance handles are provided extending rearwardly from the housing for manipulation by the operator.

8. A machine in accordance with claim 1 in which two wheels are provided beneath the housing at its rear extremity and a single, swivelly mounted wheel is provided beneath the forward extremity thereof.

9. A machine in accordance with claim 1 in which said helix is of slightly less diameter than said housing.

10. A machine in accordance with claim 1 in which the forward extremity of said helix is open and extends outwardly of said housing.

11. A machine in accordance with claim 1 in which parallel guide bars are provided extending forwardly from the lower, forward extremity of said housing aligned on each side of the forward extremity of the slot in said housing.

12. A machine in accordance with claim 1 in which said helix is rotated in a clockwise direction and said brush is rotated in a counterclockwise direction.

References Cited
UNITED STATES PATENTS

| | | | |
|---|---|---|---|
| 371,372 | 10/1887 | Savage | 56—130 |
| 636,085 | 10/1899 | Temple | 56—19 |
| 769,744 | 9/1904 | Harding | 56—110 |
| 2,874,528 | 2/1959 | Esch | 130—30 X |

LOUIS G. MANCENE, Primary Examiner

PASQUALE A. RAZZANO, Assistant Examiner

U.S. Cl. X.R.

56—327; 130—30